United States Patent Office 2,923,656
Patented Feb. 2, 1960

2,923,656

ACYL THIOUREA FUNGICIDAL AND BACTERICIDAL COMPOSITIONS AND METHOD OF PROTECTING PLANTS WITH THE SAME

Johannes Thomas Hackmann, Amsterdam, Netherlands, assignor to Shell Development Company, Emeryville, Calif., a corporation of Delaware No Drawing. Application September 18, 1953
Serial No. 381,109

Claims priority, application Germany January 8, 1952

12 Claims. (Cl. 167—22)

This invention relates to a composition for protecting plants from destruction by parasitic pathogens, particularly fungi. Also, it pertains to a method of protecting plants from destruction by parasitic pathogens, e.g., fungi, by the use of certain materials having an internal chemotherapeutic action.

It is known that certain materials, for example, ethylene bisdithiocarbamate, 2-norcamphane methanol, and 4-chloro-3, 5-dimethylphenoxyethanol, are effective for protecting plants against diseases caused by pathogens, such as fungi, through an internal chemotherapeutic action. These materials penetrate into the plants through which they spread, thereby rendering the plants immune or at least less susceptible to the attack of parasitic pathogens. Usually, the immunity lasts a few weeks, for instance, three weeks after the substances have been absorbed by the plants. In many cases the same agents also have curative effect if the plants are already affected. These materials are usually called systemic fungicides, in analogy to systemic insecticides which also penetrate into the plants rendering them toxic to insects and related animal parasites, such as mites.

In view of the fact that it is not necessary for these materials to be toxic to fungi when contacted directly therewith, as in the well known spore germination test, in order to be effective as systemic fungicides, it is believed that these systemics are converted to some other products within the living plants, the immunity and/or recovery being caused only by certain conversion products. This is merely a supposition at present, but what is certain is that a favorable effect is obtained by the penetration of the material into the plants themselves.

In many instances such parts of the plants as develop after application of the systemic fungicide, such as new shoots, blades, flowers, fruits, etc., become immune for a certain period of time, which is not the case with the use of externally acting fungicides.

In accordance with the present invention, it has been found that acyl thioureas in which the acyl radical is the residue of an organic acid containing the carbonyl radical, are particularly effective for use in protecting plants from destruction by parasitic pathogens. The term "thiourea" is used to designate generically compounds of the structural formulae

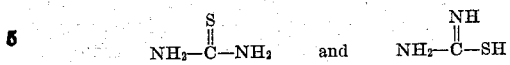

according to "An Outline of Organic Nitrogen Compounds," E. F. Degering (Mich.), 1945, page 455, paragraph 1361. Thus, the acyl thioureas of the present invention fall into two categories, the N-acyl thioureas and the S-acyl thioureas. Compounds of the structural formula

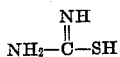

are also sometimes referred to as isothioureas, and in order to distinguish between the two isomers when naming specific compounds, the terms "thiourea" and "isothiourea" will be used to denote compounds of the formulae

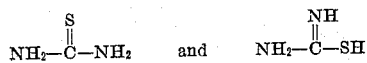

respectively.

Preferred compounds are those which satisfy either of the formulae:

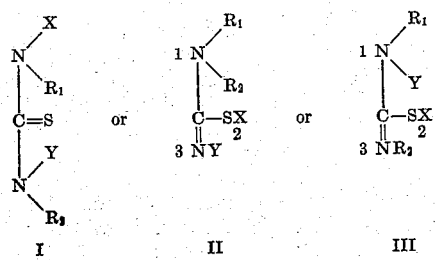

I          II          III where X is an acyl radical, Y is a hydrogen atom, an acyl radical, an alkyl radical, or a monocyclic aryl radical, and $R_1$ and $R_2$ are hydrogen, alkyl radicals, or monocyclic aryl radicals.

The radicals X, Y, $R_1$ and $R_2$ can also contain substituent groups, such as $NO_2$, $SO_3H$, OH, $NH_2$ or halogen atoms. Compounds of Formula I are generally named as N-substituted thioureas, and those of Formulae II and III as S-substituted thioureas or isothioureas. However, where compounds of the Formulae II and III are substituted on either of the nitrogen atoms, it is necessary to use the numbered positions in naming them.

Representative classes of the compounds which satisfy the above formulae are the N-acyl thioureas; the S-acyl isothioureas; the N-haloacyl thioureas; the S-haloacyl isothioureas; the N,N'-diacyl thioureas; the 2,3-diacyl isothioureas; the 1,2-diacyl isothioureas; the N-acyl, N'-alkyl thioureas; the 2-acyl, 3-alkyl isothioureas; the N-acyl, N'-phenyl thioureas; the 1-phenyl, 2-acyl thioureas, the 2-acyl, 3-phenyl isothioureas; and the like.

It is preferred that the acyl radical, X, be the residue of an alkane carboxylic acid, particularly an alkane carboxylic acid containing not more than 5 carbon atoms, such as acetic, propionic, butyric and isobutyric acid, and the pentanoic acids, or the residue of alkyl carbonate, particularly an alkyl carbonate having not more than 5 carbon atoms, for example, methyl, ethyl, propyl, isopropyl, and the butyl carbonates. It is preferred that the acyl radical be either unsubstituted, that is, contain only C, H and O atoms, or halo-substituted, and particularly substituted in the terminal carbon atom by 1 to 3 chlorine atoms. Those compounds completely halogenated at the terminal carbon atom, such as trichloroacetyl thiourea, are preferred as they are generally more stable than the partially halogenated compounds.

Where Y is an acyl radical, it is preferred that the acyl radical be one similar to X. Y can be identical with X. Where Y represents a monocyclic aryl radical, the phenyl radical containing, if desired, water-solubility-enhancing substituents such as $-SO_3H$, is particularly suitable. Where Y represents an alkyl radical, alkyl radicals containing not more than about 4 carbon atoms are preferred. Either unsubstituted alkyl radicals or alkyl radicals containing substituent halogen atoms, preferably 1 to 3 chlorine atoms attached to the terminal carbon atom, are particularly suitable.

It is preferred that $R_1$ and $R_2$ be hydrogen. Particularly good results are obtained when not only $R_1$ and $R_2$, but also Y, are hydrogen atoms, as in, for example, N-trichloroacetyl thiourea and S-acetyl thiourea.

In order for a systemic toxicant to be commercially feasible, it must be rapidly taken up by the plant, Therefore, water-soluble compounds are preferred. In the present specification, solubility in water denotes a solubility of at least about 0.01% by weight at ambient temperatures. Solubility in water is known, generally, to decrease as the number of carbon atoms in the molecule increases. Therefore, with respect to water solubility, N-acyl thioureas or S-acyl isothioureas having not more than 9 carbon atoms per molecule are preferred for use in the present invention. However, if water solubility enhancing groups, such as the —SO₃H group, are present, the number of carbon atoms per molecule can be increased. Water-insoluble compounds of the present invention can also be used if a water solubilizing agent is present.

Specific compounds which are suitable for use in the present invention include: N-acetyl thiourea; S-acetyl isothiourea; N-triacetyl thiourea (an addition product of N-monoacetyl thiourea and N,N′-diacetyl thiourea); S-chloroacetyl isothiourea; N-trichloroacetyl thiourea; S-trichloroacetyl isothiourea; N-trichloroacetyl, N′-phenyl thiourea; 2-trichloroacetyl, 3-phenyl isothiourea; 1-phenyl, 2-chloroacetyl isothiourea; N-trichloroacetyl, N′-acetyl thiourea; 2-chloroacetyl, 3-acetyl isothiourea; N-acetyl, N′-propyl thiourea; 1-propyl, 2-acetyl isothiourea; 2,3-diacetyl isothiourea; N-propionyl thiourea; S-propionyl isothiourea; N-beta-chloropropionyl thiourea; S-beta-chloropropionyl isothiourea; N-propionyl, N′-propyl thiourea; 2-propionyl, 3-propyl isothiourea; N-propionyl, N′-phenyl thiourea; 1-phenyl, 2-propionyl isothiourea; N-butyryl thiourea; S-butyryl isothiourea; N-valeroyl thiourea; S-valeroyl isothiourea; N-carbomethoxy, N′-methyl thiourea; 2-carbomethoxy, 3-methyl isothiourea; N-carboethoxy thiourea; S-carboethoxy isothiourea; N-carboethoxy, N′-propyl thiourea; 1-propyl, 2-carbomethoxy isothiourea; N-carbopropoxy thiourea; S-carbopropoxy isothiourea; N,N′-di(carbomethoxy) thiourea; 2,3-di(carbomethoxy) isothiourea; N,N′-di(carboethoxy) thiourea; 2,3-di(carboethoxy) isothiourea; and the like.

The S-acyl isothioureas of the present invention can also be used in the form of their salts. Suitable acids which can be utilized in the formation of salts include inorganic acids, such as sulfuric, nitric, phosphoric, hypophosphoric, pyrophosphoric, phosphorous, hydrochloric, and hydrobromic acids, Reinecke acid (tetrathiocyanodiammonochromic acid) and the like, and organic acids such as the lower fatty acids, e.g., acetic, propionic, butyric acid, etc., sulfonic acids, e.g., dodecylbenzene sulfonic acid, and the like. It has been found that salts of S-acyl isothioureas and inorganic oxygen acids of the elements of group V of the periodic table which have atomic weights of less than 40, that is, oxygen acids of nitrogen and phosphorus, are particularly suitable for use in the present invention because they are relatively nonphytotoxic at relatively high concentrations.

The active compounds according to the invention need not be employed in a pure condition. Inactive admixtures which have been formed in the commercial preparation thereof can be present. Mixtures of active compounds as can be readily prepared from commercial products are also suitable.

The active materials of the invention can be used alone or in combination with other fungicidal, viricidal, insecticidal or acaricidal materials, the action of which may be either internal or external, with plant nutritives, with plant hormones, and the like. Wetting agents and, if necessary or desirable, stickers can be present. Any conventional wetting agent, for example, alkyl sulfate salts, alkyl aryl sulfonate salts, sulfosuccinate salts, ethers from polyethylene glycols and alkylated phenols, and the like can be employed. If the toxic agents are employed in the form of emulsions or suspensions, for example, in water, solvents such as oils, emulsifiers, emulsion stabilizers, and the like can be added. Materials which suppress the phytotoxic action of the fungicides thereby making it possible to utilize unusually high dosages of the fungicidal material, can also be present. For example, glucose is known to protect tomato plants against damage by certain substances having a phytotoxic effect when in concentrated form, such as urea.

The active agents of the present invention can be effectively applied to the plant in various ways, as by (a) contacting parts of the plants above or in the soil therewith, (b) contacting the seed therewith, (c) introducing the agents into the soil near the roots of the plants, or (d) direct introduction of the agents into the plants, for example, through boring holes or incisions in parts of the plants.

It is important in any case that the active agent should be enabled to penetrate into the plant itself. Application to parts of the plants above the soil by means of spraying has proved to be a particularly satisfactory method. When introducing the agents into the soil care should be taken that the agents are introduced as near to the roots as possible and that sufficiently high concentrations be absorbed by the components of the soil as the agents might undergo a chemical or microbiological conversion before penetrating into the plants.

Spraying of the plants to be treated is preferably performed with aqueous solutions or suspensions of the active agents. Aqueous solutions or suspensions containing from about 0.01 to about 1% by weight and preferably from about 0.1 to about 0.5% by weight of the active agent are particularly suitable. Higher concentrations of the fungicidal agents can be employed if no phytotoxic effects are observed. As a rule, however, because of the danger of phytotoxicity, the use of low concentrations is recommended. If desired, a minor amount, of the order of from about 0.01 to about 0.05% by weight, of a wetting agent can be added to aid in forming a suspension of the active agent in the aqueous medium. Any of the conventional wetting agents, such as those mentioned above, can be employed. A particularly suitable wetting agent is the sodium salt of a mixture of secondary heptadecyl sulfates, sold commercially under the name of "Teepol."

The proof that the agents applied to the plants had penetrated into the interior of the plants and exerted their action from there, was furnished by exposing part of the plants treated to artificial rain, so that any trace of the agent still present was washed away. The plants exposed to artificial rain were found to behave just as those treated with the active agent, but not exposed to artificial rain afterwards.

The plant-protecting agents of the present invention are effective against widely divergent parasitic pathogens, some of which, all of great practical importance, are mentioned in the following table:

TABLE I

| Latin Name of the Pathogen | English Name of the Disease | Most Important Plants on Which the Disease May Occur |
|---|---|---|
| Cladosporium fulvum | Leaf mould (tomato disease) | Tomato plants. |
| Septoria apii graveo-lentis | | Celery plants. |
| Phytophthora infestans | Late blight (potato disease) | Potato plants. |
| Colletotrichum Lindemuthianum | Anthracnose | Brown kidney bean plants (Phaseolus vulgaris L.). |
| Exobasidium vexans | Blister blight | Tea plants. |
| Erysiphaceae (various species) | Mildew | Various plants, e.g., apple trees. |
| Uredinales (various species) | Rust | Corn species. |
| Fusarium (various species) | Wilt disease | Cucumber plants. |
| Ceratostomella ulmi | Dutch elm disease | Elm trees. |
| Pseudomonas (various species e.g., Agrobacterium tumefaciens) | Crown gall | Tomato and many other plants. |

All of the pathogens mentioned in Table I are fungi, except the last which is a species of bacteria.

In general, the active agents of the present invention showed no or only an insignificant activity in the well-known spore germination test.

The activity of the toxic compounds of the present invention was, in general, determined by the following method:

Test plants were sprayed with an aqueous solution of the agent until the liquid dropped from the leaves. After the spray liquid dried, usually after about two days, the plants were exposed to contamination with the pathogen.

In all cases, a part of the test plant was also treated prior to contamination, with artificial rain consisting of tap water containing about 0.2% by weight of "Teepol" in order to completely remove the spray liquid from the surface of the leaves of the plants.

Depending on the kind of test plant and of the fungus, contamination was effected either by inoculation of the plant or by placing the plant in contaminated suroundings, for example, in a greenhouse in which plants affected by the pathogen were present. Conditions were chosen such that the untreated plants soon became diseased. After a certain period had elaspsed, depending on the plant tested, the ratio of the affected leaf surface to the total leaf surface was determined for both the treated and the untreated plants. The quantity obtained by subtracting the quotient of these two numbers from one is a measure for the degree to which suppression of the pathogen has succeeded. Hereinafter, this quantity, expressed in percent, will be termed the degree of suppression. The degree of suppression was determined at a time at which the untreated plants showed clear symptoms of the disease. As a rule, the leaf surfaces were not measured, but estimated with the required accuracy. An experienced person can in this way determine the degree of suppression with an accuracy of about 5%. This accuracy is sufficient since, in general, results obtained in biological tests are only reproducible within rather wide limits.

The invention is illustrated by the following examples:

Example I

Tomato plants were sprayed with aqueous solutions of several active compounds in various concentrations. Spraying was continued until the liquid dripped from the leaves.

Two days later the plants were moved to a space which was heavily infested with spores of *Cladosporium fulvum*. The following table shows the degree of suppression after 14 days.

| Formula | Compound Employed Name | Concentration of Solution Sprayed (percent wt.) | Degree of Suppression |
|---|---|---|---|
| H−C(=O)−N(CH₃)−C(=S)−NH₂ | Acetyl thiourea<br>do<br>do<br>do | 0.1<br>0.2<br>0.3<br>0.4 | 50<br>72<br>86<br>100<br>96 |
| H−C(=O)−N(CH₃)−C(=S)−NH₂ and H−C(=O)−N(CH₃)−C(=S)−N−C(=O)CH₃ | Triacetyl thiourea (addition product of mono- and di-acetyl thiourea) | 0.1<br>0.2<br>0.3<br>0.4 | 90<br>60<br>100<br>98 |
| H−N−C(=O)−CCl₃ \| C=S \| N−C₆H₅ \| H | N-Trichloroacetyl<br>N'-phenyl thiourea | 0.05 | 80 |
| H−N−C(=O)−(CH₂)₃−CH₃ \| C=S \| NH₂ | N-valeroyl thiourea | 0.05 | 80 |

Example II

Brown kidney bean plants (*Phaseolus vulgaris* L.) approximately three weeks old were sprayed with a 0.5 percent solution of trichloroacetyl thiourea, to which solution 0.1 percent of "Teepol" had been added. Two days later the plants were inoculated with *Colletotrichum lindemuthianum*.

The evaluation took place after three weeks. All the "zero" plants showed a heavy affection by anthracnose, as opposed to the treated plants which had remained completely sound. The degree of suppression was 100%.

Trichloroacetyl thiourea

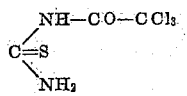

was prepared by heating a benzenic solution of equimolar amounts of trichloroacetic anhydride and thiourea.

On cooling, trichloroacetyl urea separated and was recrystallized from alcohol (melting point 145–146° C.)

Example III

*Agrobacterium tumefaciens* is a bacterium which causes tumors on woody as well as herbaceous plants. It was proved that these tumors could be cured by means of an external treatment with aqueous solutions of the active compounds according to the invention. After three weeks a 100% cure was achieved when tomato plants were treated with acetyl and with triacetyl thiourea, both in a concentration of 0.3 percent. No phytotoxic symptoms were observed.

An equally good result was observed after a treatment with a 0.5 percent solution of S-acetyl isothiourea (as hydrochloric acid salt).

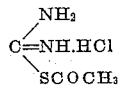

Example IV

A 0.3 percent solution of S-acetyl isothiourea (hydrochloric acid salt)

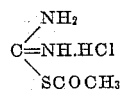

was sprayed on celery plants, about 20 cm. high. Two days later the plants were moved into a moist greenhouse, together with a number of celery plants which had not been sprayed. The plants were then inoculated with spores of *Septoria apii graveolentis*. Three weeks later the effect was assessed. Degree of suppression 80%.

Example V

The roots of gherkin plants (1 month old) were dipped for 4 to 5 hours in a 0.03% solution of S-carboethoxy isothiourea (hydrochloric acid salt)

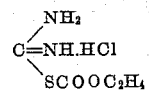

and then placed for 4 to 7 days in pots with sterilized sand, to which nutritive salts had been added. Then the plants were taken from the pots and the roots were dipped for 4–5 hours in a spore suspension of Fusarium (various species) after which the plants were again placed in sterilized sand. Many of the plants so treated did not as yet show any signs of wilt disease, while nearly all the "zero" plants had died or had yellowed to a large extent and become limp.

Example VI

A number of apple tree seedlings (20 cm. high) in pots were sprayed with an aqueous solution of 0.1% by weight of triacetyl thiourea with an addition of 0.1% by weight of "Teepol" as wetting agent. 80 cu. cm. were applied per square meter. Three days later the plants were placed in a greenhouse and inoculated with spores of apple mildew. After three weeks the affection of leaves which had in the meantime unfolded at the top was determined. A degree of suppression of 80% was attained.

Example VII

Out of six three-year old elm trees (about 2 m. high, variety *hollandica*) which were planted in concrete troughs containing one cu. m. of earth, two trees were bored in the trunk to the core. A rubber tubule was introduced into the small hole formed (diameter 3 mm.), which tubule was connected with a small storage vessel containing a 0.02% wt. of aqueous solution of S-carboethoxy isothiourea hydrochloric acid salt by means of a rubber tube. In the course of two days the solution was entirely absorbed by the plant.

Two days after the end of the absorption period the trees were inoculated at the trunk with a suspension of spores of some races of *Ceratostomella ulmi*.

With two other trees 2 liters of a 0.1% wt. aqueous solution of the same active compound were injected among the roots at a depth of 50 cm., while 23 liters of the same solution were poured out upon the soil. Four days later the trees treated in this way, as well as the trees left untreated, were also inoculated.

Three, and in particular six weeks, after the inoculation the untreated trees showed clear symptoms of Dutch elm disease, while all the treated trees had an entirely sound appearance.

Example VIII

Cucumber plants having a height of about 10 cms. were placed for four hours with their roots in various concentrations of solutions of the nitrate and the phosphate of S-carboethoxyisothiourea. The treated plants were then replanted. After a few days, the phytotoxicity of the salts being tested was determined. The plants showed no damage at concentrations of the salts of 0.3% and even at concentrations as high as 0.5%.

It was also noted that the phosphate of S-carboethoxy-isothiourea had a growth-promoting effect.

The present application is a continuation-in-part of my copending application, Serial No. 329,737, filed January 5, 1953, now abandoned.

I claim as my invention:

1. A composition suitable for protecting plants from destruction by fungi and bacteria comprising as the active ingredient, an acyl thiourea containing not more than 5 alkane carbon atoms in the acyl radical selected from the group consisting of N-acetyl thiourea of the formula

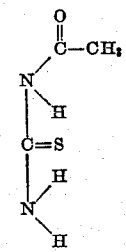

trichloroacetyl thiourea of the formula

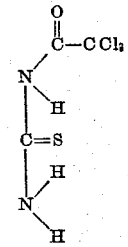

S-acetyl isothiourea of the formula

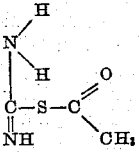

S-carboethoxy isothiourea

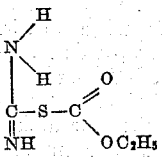

and the addition product of N-acetyl thiourea and N,N'-diacetyl thiourea, and a fungicidal and bacterial adjuvant as a carrier therefor comprising a minor amount of a surface active wetting agent in aqueous medium.

2. The composition of claim 1 in which the active ingredient is N-acetyl thiourea.

3. The composition of claim 1 in which the active ingredient is trichloroacetyl thiourea.

4. The composition of claim 1 in which the active ingredient is S-acetyl isothiourea.

5. The composition of claim 1 in which the active ingredient is S-carboethoxy isothiourea.

6. The composition of claim 1 in which the active ingredient is the addition product of N-acetyl thiourea and N,N'-diacetyl thiourea.

7. The method of protecting plants from destruction from fungi and bacteria which comprises applying to growing plants a composition comprising as the active ingredient, an acyl thiourea containing not more than 5 alkane carbon atoms in the acyl radical selected from the group consisting of N-acetyl thiourea of the formula

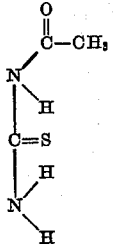

trichloroacetyl thiourea of the formula

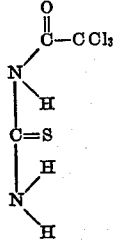

S-acetyl isothiourea of the formula

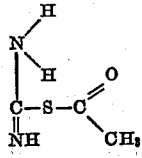

S-carboethoxy isothiourea

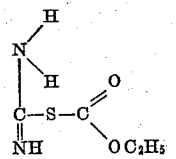

and the addition product of N-acetyl thiourea and N,N'-diacetyl thiourea, and a fungicidal and bacterial adjuvant as a carrier therefor comprising a minor amount of a surface active wetting agent in aqueous medium.

8. The method of claim 7 in which the active ingredient is N-acetyl thiourea.

9. The method of claim 7 in which the active ingredient is trichloroacetyl thiourea.

10. The method of claim 7 in which the active ingredient is S-acetyl isothiourea.

11. The method of claim 7 in which the active ingredient is S-carboethoxy isothiourea.

12. The method of claim 7 in which the active ingredient is the addition product of N-acetyl thiourea and N,N'-diacetyl thiourea.

References Cited in the file of this patent

FOREIGN PATENTS 326,567    Great Britain _____ Mar. 20, 1930

OTHER REFERENCES

U.S. Dept. of Agr. Bur. of Entomology and Plant Quarantine, Bull. E-620, May 1944, pp. 1-4.

Frear, Donald E. H.: Chem. of Insect., Fung. and Herb., 2nd ed., September 1948, p. 283.